June 10, 1924.

W. L. FLEISHER

APPARATUS FOR DESICCATION

Original Filed Feb. 2, 1921

1,497,168

INVENTOR
W. L. FLEISHER
BY
ATTORNEY

Patented June 10, 1924.

1,497,168

UNITED STATES PATENT OFFICE.

WALTER L. FLEISHER, OF NEW YORK, N. Y., ASSIGNOR TO W. L. FLEISHER & CO., INC., OF NEW YORK, N. Y., A CORPORATION OF NEW YORK.

APPARATUS FOR DESICCATION.

Original application filed February 2, 1921, Serial No. 441,930. Divided and this application filed December 9, 1922. Serial No. 605,940.

*To all whom it may concern:*

I, WALTER L. FLEISHER, a citizen of the United States, and a resident of the county of New York, city and State of New York, have invented a new Apparatus for Desiccation, of which the following is a full, clear, and exact description.

An object of the invention is to provide an apparatus of the class described which is simple in construction and is suitable for spray drying of various substances.

Another object of the invention is to provide an apparatus suitable for spray drying of a great variety of substances that can be sprayed with substantially no radical changes in the construction of the apparatus.

This application is the division of my application, Serial #441,930, filed February 2nd, 1921.

The drying or desiccating agent in this apparatus is warm air circulated to form currents in the shape of a hollow cylinder into which the substance to be desiccated is atomized so that it tends to intersect the opposite faces of the hollow cylinder, that is the oppositely moving portions of the interconnected air currents. The atomized substance is introduced in a plane which passes substantially through the elements of the hollow cylinder formed by the air currents in the spray chamber. The circulation of the drying agent is so regulated within the spray chamber that the air may be caused to make one or more revolutions or turns before it is allowed to escape from the spray chamber. By this means the efficiency of the drying is considerably increased.

In my apparatus the air is so circulated that the hottest or driest air contacts with that part of the sprayed substance which has already been in contact with air not so hot or dry. In other words, the hottest or driest air in my arrangement acts on partially dried particles of the spray, in consequence case hardening of the particles is prevented. Further than that, the air that has already absorbed some of the moisture from the particles, as it approaches its exit, strikes the fresh spray directed by the nozzles into the spray chamber. In consequence, the dust which is carried by the effluent air is washed down, thereby reducing considerably the dust within the spray chamber.

Figure 1:
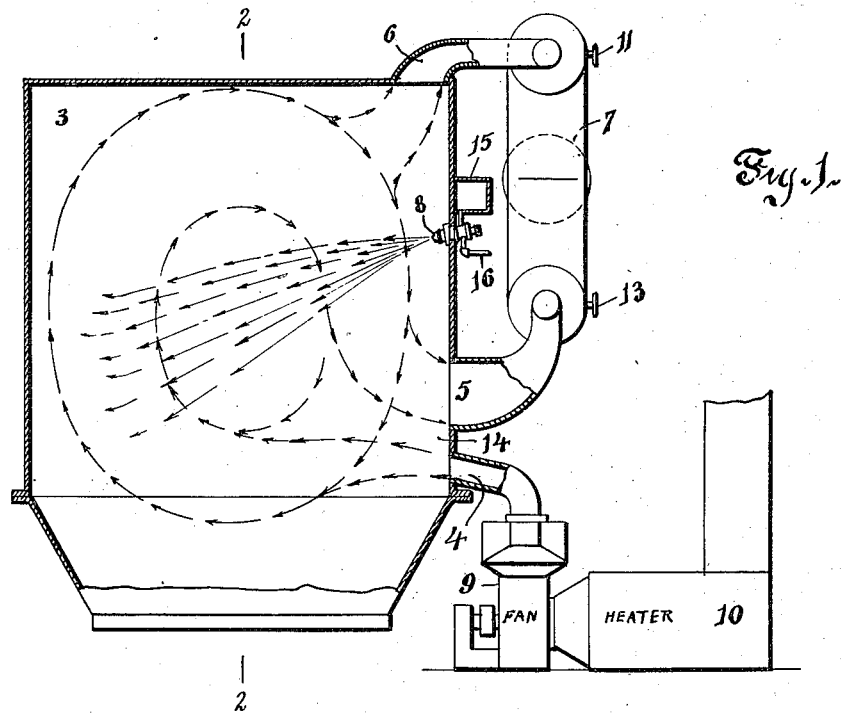
Figure 2:
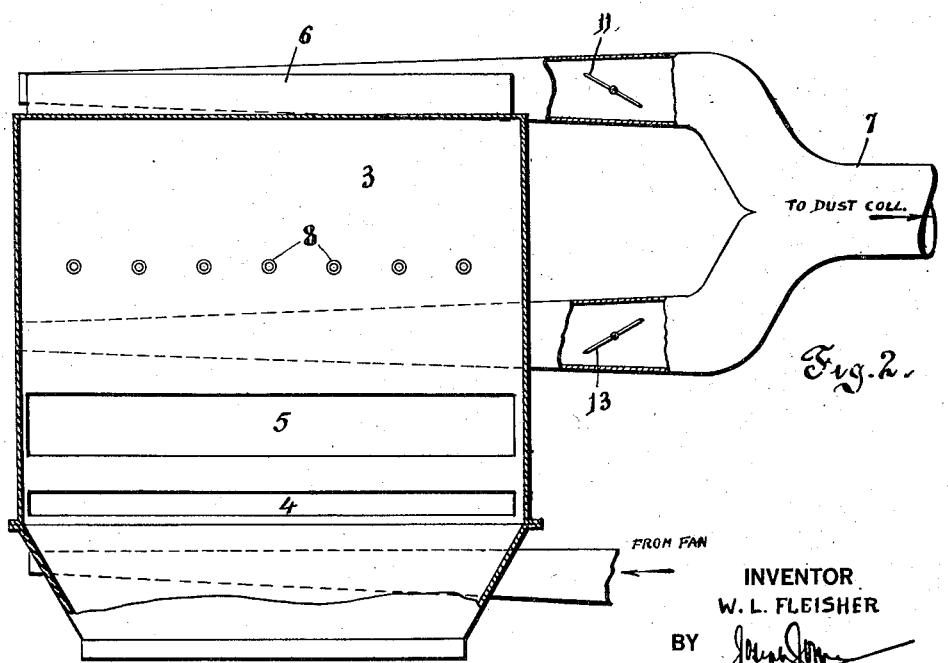

In the accompanying drawing, forming part of the application, Figure 1 represents a diagrammatic sectional view through a form of apparatus embodying my invention, and Figure 2 shows a vertical section through Figure 1, on line 2—2.

Referring to the drawing, 3 is a desiccating chamber which has an elongated air inlet 4, preferably extending substantially along the entire wall (see Figure 2) and located preferably in proximity to the bottom of the chamber. The inlet 4 enters the chamber at an angle to the horizontal (see Figure 1) so as to direct the entering air current at an angle to the horizontal, (preferably the current is deflected upward) so as to reduce the downward deflection of the entering current by the induced current formed between the inlet 4 and the main outlet 5, the said outlet extending substantially through the entire width of the chamber and located in proximity of the inlet 4 and above the same. A direct rise of the air from the inlet to the outlet is prevented by the velocity imparted to the entering air layer which causes the said layer to shape itself substantially in the form outlined by arrows in Figure 1, between the inlet and the main outlet.

The thickness of the air layer forming the wall of the hollow air cylinder within the chamber 3 varies from the inlet to the outlet due to the sudden expansion of the entering air layer within the spray chamber and the subsequent contraction of the said air layer when it leaves the chamber 3 through the main outlet 5. Due to the expansion of the air within the chamber 3 the velocity of the air layer at the inlet and at the outlet is greater than at any point between the two, the minimum velocity of the air layer being in the most expanded part of the air layer.

The chamber 3 has means for controlling the intensity of the induced current in the gap 14 formed by the inlet 4 and the main outlet 5. The said means are in the form of an auxiliary air outlet 6 located in proximity or at the top of the chamber 3 and extending substantially through the entire width of the chamber.

The auxiliary air outlet 6 and the main air outlet 5 unite in a suitable conduit 7 which leads to the dust collecting chamber not shown, as it does not form part of the invention.

As will be noted, in a rectangular chamber, the air inlets and the air outlets are located at the same side of the chamber, but in a drumlike chamber where there is no side, the relation of the inlets and the outlets remains the same as shown.

A series of nozzles 8 enter the chamber 3 between the outlets 5 and 6. The entering nozzles are disposed in a horizontal row above the outlet 5 and substantially parallel therewith. The row of nozzles is adapted in combination to produce a flat sheet of the atomized substance at an angle to the horizontal and preferably directed downward to enter the hollow cylinder formed by the drying air current within the chamber 3 (see Figure 1).

The air current striking the entering spray causes a deflection of the spray as it penetrates into the air current. The particles that pass across the hollow of the cylinder are picked up by the oppositely moving currents and carried toward the spray nozzles where their size is increased by the contact with the spray entering the air current.

The air current is formed through the inlet 4 into the chamber 3 by a fan 9 which fan draws the air through a suitable heater 10. The air entering the chamber at a high velocity is forced by the fan towards the wall opposite the inlet 4, which wall aids the current to deflect upwardly toward the top of the chamber. The top in turn aids the current to deflect downwardly toward the outlet 5. In a drumlike chamber the wall of the chamber will facilitate the shaping of a more regular hollow cylinder than the rectangular chamber shown in the drawing.

A portion of the current directed toward the main outlet 5 is deflected through the auxiliary outlet 6 and the leakage therethrough is controlled by a damper 11. A damper 13 controls the outflow from the main outlet 5. By means of the dampers 11 and 13 the induced current in the gap 14 between the inlet 4 and the outlet 5 may be controlled. That is to say, a change in the adjustment of the outlet dampers in the main outlet and auxiliary outlet changes the number of revolutions that the particles of the air currents make in the path of the currents about the house before they are allowed to escape.

The particular advantage of this method is due to the fact that in each revolution a particular air particle of the air picks up an amount of moisture and the total amount of moisture picked can be brought to practically the theoretical saturation point of the air by a proper adjustment of the outlet dampers. The substances to be dried give up their moisture differently in air of different degrees of saturation. Certain substances will give up moisture in highly saturated air, other substances require lower degrees of saturation of the air to give up their moisture. The higher the degree or percentage of saturation to which the air can be brought, the greater the efficiency of the method.

It is, therefore, desirable to be able to adjust the number of revolutions of the particles in the current to the number where the highest efficiency of drying can be obtained. In my apparatus, any degree of saturation up to practically theoretical saturation can be obtained by varying the number of times that the particles of the air currents are made to revolve. In my apparatus I am able to control the number of whirls easily and readily in order to obtain the required percentage of saturation to suit the particular substance to be dried, by means of a very simple adjustment of dampers in the main and the auxiliary outlets. Without the auxiliary outlet 6 and the control between outlet 5 and auxiliary outlet 6 it would be necessary to change the width of the gap 14 each time it was desired to establish the proper number of whirls to achieve the maximum absorption or efficatiousness or capacity, but with the arrangement shown, no changes are necessary except the readjustment of the flow of air through the auxiliary outlet 6 and the main outlet 5.

The nozzles 8 are fed from a tank 15 which contains the matter to be desiccated. The matter entering the nozzles is broken up by the air supplied to the nozzles through a conduit 16 by means of which the desired spray is formed within the chamber 3. If desired, pressure nozzles may be used to obtain the desired spray within the chamber 3. The velocity of the spray formed within the chamber is such that the same should not be strong enough to pass entirely across the air currents forming the hollow cylinder. That is, it should not strike the wall opposite the nozzles.

It will be noted that the opposite layers of the air forming the hollow cylinder are moving in opposite directions, that is to say, within the spray chamber oppositely directed air currents are formed, through which air currents the substance to be desiccated is sprayed. In a vertical chamber, in which the inlets and the outlets are in horizontal planes, there will be a rising and descending current, as shown in the drawing. The entering spray attacks the descending current first before it can enter the ascending current. The descending current has been in contact with particles of the spray that cross the hollow cylinder, and therefore its drying effect upon the spray is not of a character to cause crust formation on said particles, due to the fact that the said descending current carries already some moisture due to its contact with the particles of spray that have been attacked by the ascending current, which is the hotter and drier of the two and which becomes the descending current as it continues its movement within the spray chamber.

It is to be remarked that by varying the leakage through the auxiliary outlet 6 the hollow of the cylinder may be varied in size. That is to say, the descending current is brought nearer to the wall in which the inlet and the nozzles are located by increasing the leakage through the auxiliary outlet 6. In other words, the two oppositely moving currents may be brought further apart by increasing the leakage through the auxiliary outlet 6. By stopping the leakage through the auxiliary outlet 6 the descending current may be moved a considerable distance away from the wall carrying the nozzles. It must be understood that the total air taken out from the main outlet 5 and the auxiliary outlet 6 is constant when the flow from the inlet 4 is constant.

I claim:

1. An apparatus of the class described comprising in combination a chamber having an air inlet near the bottom of same, an air outlet in proximity to the inlet and an auxiliary air outlet in proximity to the stop of the chamber, and means for admitting a fluid to be desiccated associated with the chamber and located between the air outlets.

2. An apparatus of the class described comprising in combination a chamber having an air inlet near the bottom of the chamber, an air outlet in proximity to the inlet and an auxiliary outlet at the top of the chamber, means for admitting a fluid to be desiccated into the said chamber disposed between the air outlets, and a damper for each of the said air outlets.

3. An apparatus of the class described comprising in combination a chamber means for admitting a continuous stream of air through the chamber, said chamber having a main and auxiliary air outlets, said outlets being on the same side of said air chamber, and means disposed between the outlets for delivering a fluid to be desiccated into the said chamber, also located on the same side with the outlets.

4. In an apparatus of the class described, a chamber having an air inlet and two air outlets disposed to one side of the air inlet, and spray forming means disposed between the outlets to direct a flow away from the inlet and the outlets.

5. In an apparatus of the class described, a chamber having an air inlet and two air outlets, one of the air outlets being in closer proximity of the air inlet than the other, and spray forming means disposed between the outlets to direct the spray away from the outlets.

6. In an apparatus of the class described, a spray chamber having an air inlet and two air outlets, at different levels from each other and the inlet, and spray forming means disposed between the outlets to direct the spray away from the outlets.

7. In an apparatus of the class described, a spray chamber having an air inlet and two air outlets disposed to one side of the inlet, said inlet and each of the outlets, respectively, being at different levels, and a row of spray forming means disposed between the outlets, to direct a spray away from the outlets.

8. In an apparatus of the class described, comprising in combination a chamber having an air inlet, a main air outlet in proximity of the inlet, and an auxiliary outlet remote from the main outlet, and means disposed between the outlets for delivering a fluid to be desiccated in a direction away from the outlets.

WALTER L. FLEISHER.